United States Patent
Tian et al.

(10) Patent No.: US 12,373,924 B2
(45) Date of Patent: Jul. 29, 2025

(54) IMAGE RESTORATION METHOD BASED ON PHYSICAL SCATTERING MODEL

(71) Applicant: SHENYANG INSTITUTE OF AUTOMATION, CHINESE ACADEMY OF SCIENCES, Liaoning (CN)

(72) Inventors: Jiandong Tian, Liaoning (CN); Shijun Zhou, Liaoning (CN); Zhen Zhang, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 17/999,696

(22) PCT Filed: Jan. 17, 2022

(86) PCT No.: PCT/CN2022/072313
§ 371 (c)(1),
(2) Date: Nov. 22, 2022

(87) PCT Pub. No.: WO2023/070958
PCT Pub. Date: May 4, 2023

(65) Prior Publication Data
US 2024/0046421 A1 Feb. 8, 2024

(30) Foreign Application Priority Data
Oct. 28, 2021 (CN) .......................... 202111261649.5

(51) Int. Cl.
*G06T 5/70* (2024.01)
*G06T 7/507* (2017.01)
(Continued)

(52) U.S. Cl.
CPC ................ *G06T 5/70* (2024.01); *G06T 7/507* (2017.01); *G06T 7/70* (2017.01); *G06T 7/80* (2017.01);
(Continued)

(58) Field of Classification Search
CPC .. G06T 5/70; G06T 7/507; G06T 7/70; G06T 7/80; G06T 2207/10152; G06T 5/00;
(Continued)

(56) References Cited

U.S. PATENT DOCUMENTS

| 5,448,382 A | 9/1995 | Land et al. |
| 2014/0140619 A1 | 5/2014 | Mukhopadhyay et al. |

FOREIGN PATENT DOCUMENTS

| CN | 105476653 A | 4/2016 |
| CN | 107256536 A | 10/2017 |

(Continued)

OTHER PUBLICATIONS

J. Tian, Z. Murez, T. Cui, Z. Zhang, D. Kriegman and R. Ramamoorthi, "Depth and Image Restoration from Light Field in a Scattering Medium," 2017 IEEE International Conference on Computer Vision (ICCV), Venice, Italy, 2017, pp. 2420-2429 (Year: 2017).*

(Continued)

*Primary Examiner* — Stephen R Koziol
*Assistant Examiner* — Dylan J Sherrillo
(74) *Attorney, Agent, or Firm* — NKL Law; Allen Xue

(57) ABSTRACT

A new image formation model for descattering different from the previous works based on atmospheric scattering model is established. It can provide a corresponding physical explanation for each scattering environment, illustrate a relationship between a light source position and scattering conditions and solve the problem of scattering removal under non-uniform illumination. Firstly, a dark angle of a camera is removed by an integrating sphere; then, a pure (Continued)

scattering part is found by an improved dark channel-like prior method; and finally, a zenith angle, an azimuth angle, an extinction coefficient and other related physical quantities are calculated according to the light attenuation and backscattering distribution of a scattering medium to eliminate the backscattering and light attenuation. Theoretically, the model can be used in any uniform scattering medium, such as underwater and fog environments, and works well in high-density media.

7 Claims, 16 Drawing Sheets

(51) Int. Cl.
    *G06T 7/70*      (2017.01)
    *G06T 7/80*      (2017.01)
    *G06V 10/75*      (2022.01)

(52) U.S. Cl.
    CPC .. *G06V 10/751* (2022.01); *G06T 2207/10152* (2013.01)

(58) Field of Classification Search
    CPC ............. G06T 7/50; G06T 2207/10016; G06T 2207/20024; G06T 5/73; G06V 10/751; G06V 10/60
    See application file for complete search history.

(56) References Cited

FOREIGN PATENT DOCUMENTS

| | | | | |
|---|---|---|---|---|
| CN | 107807366 A | * | 3/2018 | |
| CN | 109357757 A | * | 2/2019 | ............. G01C 25/00 |
| CN | 111598800 A | * | 8/2020 | ............. G06T 5/002 |
| CN | 111860640 A | | 10/2020 | |
| CN | 111861896 A | | 10/2020 | |
| CN | 113284060 A | | 8/2021 | |
| CN | 114037625 A | | 2/2022 | |

OTHER PUBLICATIONS

Wang, Guolin et al.; "Image Color Correction Based on Double Transmission Underwater Imaging Model", Acta Optica Sinica; vol. 39, No. 9; Sep. 2019; pp. 0901002-1 to 0901002-10.
Tian, Jiandong et al.; "Depth and Image Restoration from Light Field in a Scattering Medium", IEEE International Conference on Computer Vision, Dec. 31, 2017; pp. 2401-2410.

* cited by examiner

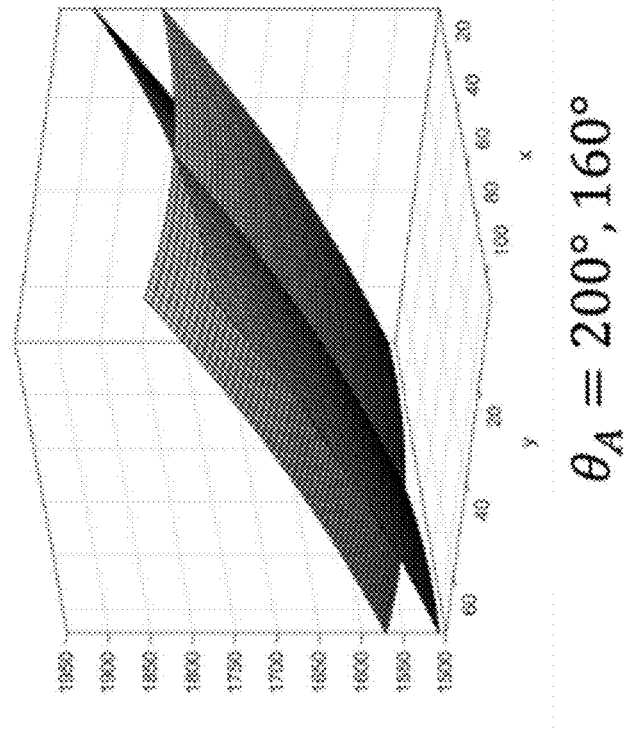
FIG. 7B  $\theta_A = 200°, 160°$
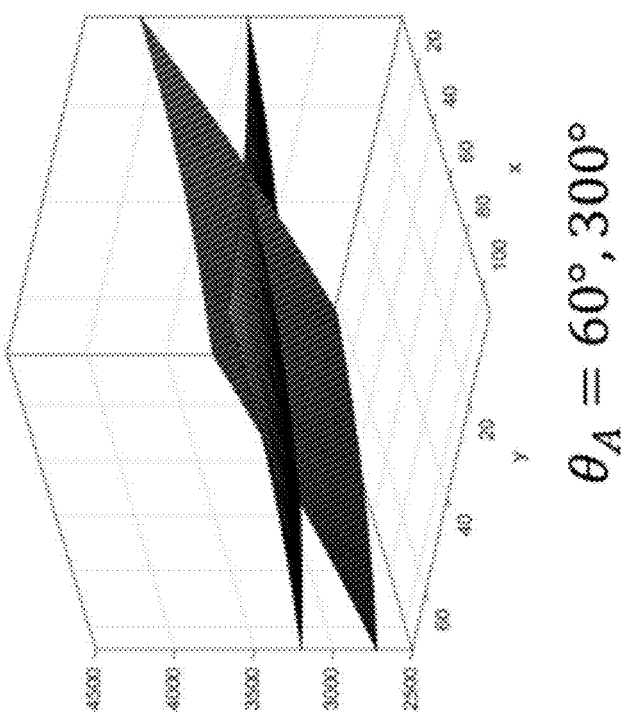
FIG. 7A  $\theta_A = 60°, 300°$ $\theta_A = 0°, 360°$ $\theta_A = 90°, 270°$

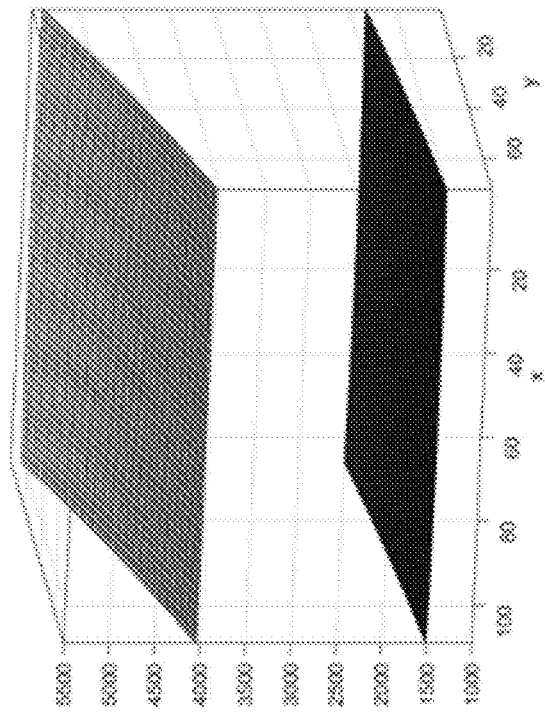
FIG. 7E  $\theta_A = 90°, 180°$
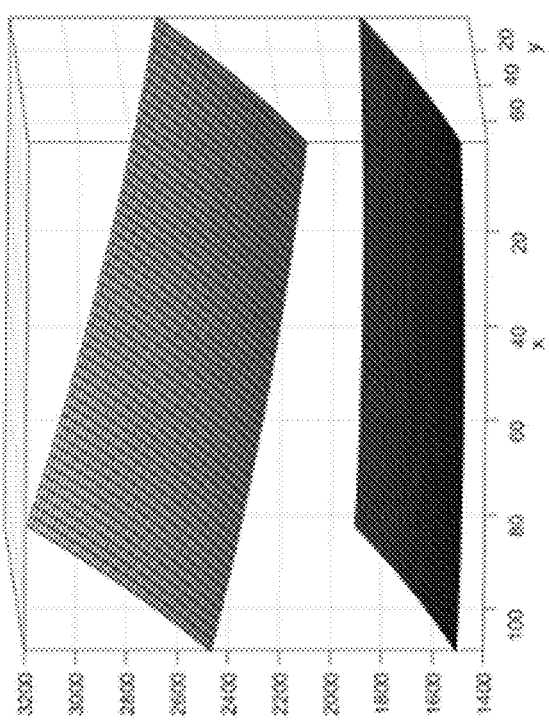
FIG. 7F  $\theta_A = 0°, 180°$ $g = 0.5, 0.3$ $\sigma = 0.0008, 0.0016, 0.0032$ $$f = 24,105$$

IMAGE RESTORATION METHOD BASED ON PHYSICAL SCATTERING MODEL

TECHNICAL FIELD

The present invention relates to a scattering model, and particularly to an image restoration method based on physical parameters, which explains a relationship between a light source position and backscattering.

BACKGROUND

In recent years, advances in technology have allowed people to collect images and videos in strong scattering environments. However, in practical engineering environments, removing backscattering has been an ongoing problem. Backscattering causes color distortion and blurring in the image. This severely affects the performance of standard computer vision algorithms, because generally the algorithms are developed to work in clear air. Therefore, in order to obtain reasonable results by the algorithms, the image must first be de-scattered. The well-known atmospheric scattering model is based on the Beer-Lambert law:

$$I(x)=J(x)t(x)+A(1-t(x)) \quad (1)$$

$$t(x)=e^{-\sigma z} \quad (2)$$

where atmospheric light A depends on a depth map, t(x) is related to an attenuation coefficient σ and depth z, the input image is I(x), and the clear image is J(x). The model is relatively simple and can remove scattering from air and water by only a few parameters. This also brings some disadvantages, i.e., all complex situations cannot be covered.

When the midday light shines from south, the zenith angle is close to the minimum value of the day, and the overall brightness of the image is brighter than other time points. The zenith angle is the angle between the incident direction of the light and the zenith direction, and the variation period can be a whole year. When shooting to a light source, the image brightness on a photo is symmetrical about the middle axis. Similarly, when the shooting angle and the lighting angle are 90°, the image brightness is monotonous with respect to the long axis of the image. In an image, a part farther from the light source has low brightness. Similarly, the farther the lens is from the light source, the lower the overall brightness of the image is. When underwater, this is reflected in the distance of the water surface from the lens. Camera settings, such as lens aperture, focal length, shutter speed and the like, also affect the overall brightness and pixel distribution of the image. These light-induced phenomena affect the removal of backscatter. Thus, it is necessary and physical to consider all these factors.

It can be seen from the above that the change of the position of the light source will cause the change of the pixel value of the image and the change of the backscattering distribution, while the atmospheric scattering model cannot consider the information of the light source. Considering the relationship between the position of the light source and the scattering is the core idea of the method proposed by the present invention.

SUMMARY

In view of the above technical deficiencies, the present invention provides an image restoration method based on a physical parameter scattering model. 1) A new model based on physical parameters is proposed to eliminate the problem of image degradation caused by backscatter and light attenuation of images captured in scattering media. 2) The limitations of the previous works based on the well-known atmospheric scattering model are discovered, and the problem of image contrast loss caused by non-uniform illumination in scattering media is solved by proposing a completely different model method. The relationship between the atmospheric scattering environment and the position of the light source is explained, and the model can theoretically be used for images captured in any homogeneous scattering medium (such as underwater and smoky environments). 3) The model is especially effective when solving images with high-density scattering problems.

The technical solution adopted by the present invention to solve the technical problems is: an image restoration method based on a physical scattering model comprises: establishing a model mapping relationship between a physical position of a light source and scattering, and dividing an attenuated image into a backscatter component and a direct radiation component for calculation; taking image sampling points and approximating a most real physical parameter through multiple fittings; and inversely substituting the calculated physical parameter into a model to calculate an attenuation value and backscattering of the entire image, to restore a clear image.

The method comprises the following steps:

step 1. calibrating the vignetting of a camera by an integrating sphere for the attenuated image;

step 2. converting image pixel coordinates into coordinates in a world coordinate system;

step 3. establishing a de-scattering mathematical model, dividing the attenuated image into two parts of direct radiance and backscatter, and deriving the model mapping relationship respectively;

step 4. sampling a corrected image from which vignetting is removed, conducting OSTU binarization processing, and obtaining a partial pixel region of pure scattering for fitting and parameter calculation;

step 5. removing backscattering and attenuation from the entire image by the calculated parameters.

Calibrating the vignetting of a camera by an integrating sphere comprises:

establishing a vignetting table;

taking an original attenuated image by the integrating sphere, obtaining a correction factor at each pixel position, and using the coefficient to eliminate vignetting for the original attenuated image pixel by pixel by a look-up table method to obtain the corrected image.

A direct radiation item can be expressed by the following formula:

$$I_d^c(x) = J^c(x) e^{-\sigma^c \left[ \left( Y_u - \frac{y}{f} Z \right) \sec(\theta_z) + r \right]}$$

A backscattering item can be expressed by the following formula:

$$L_b^c(x, y) = E^c e^{-\sigma^c Y_u \sec(\theta_z)} \beta^c P(g, \alpha) \eta \int_0^{Z_s} e^{-\sigma^c \left[ -\frac{y}{f} \sec(\theta_z) + \eta \right] Z} dZ$$

The clear image is represented by the following formula:

$$J^c(x) = \frac{I^c(x) - L_b^c(x, y)}{e^{-\sigma^c\left[\left(Y_u - \frac{y}{f}Z\right)\sec(\theta_Z) + r\right]}}$$

where $I^c(x)$ is an input image to be restored, $L_b^c(x, y)$ is the backscattering item, and $$e^{-\sigma^c\left[\left(Y_u - \frac{y}{f}Z\right)\sec(\theta_Z) + r\right]}$$

is the direct radiation item.

Obtaining a partial pixel region of pure scattering comprises extracting pixels that only contain scattering components and have similar depths for estimating physical parameters:

a. converting the input image from a RGB space to an HSV space, and extracting a saturation channel and an intensity channel;

b. calculating an optimal global threshold by OSTU maximum between-class variance method to obtain image regions with high intensity and saturation;

c. further sampling at intervals in x and y directions of the image to generate a point set V;

d. applying an improved DCP-like rule within the point set V of the image:

$$J^c(x) = \min_{y \in \Omega(x)} (I^c(x)), x \in V$$

obtaining the image region of $J^c(x) \approx 0$.

The physical parameters comprise the zenith angle of the sun, the azimuth angle, the focal length of the camera, illuminance, extinction coefficient, depth from an object to the camera, an anisotropy constant, and a distance from the object in water to a water surface.

During fitting and parameter calculation, since the influences of different parameters on functions are different, fitting and solving are performed in sequence according to the fitting priority of the parameters.

The method is used for restoring images under non-uniform illumination according to the relationship between the light source position and scattering distribution.

The present invention has the following beneficial effects and advantages:

1. The method of the present invention establishes a new image formation model for de-scattering, which is different from the current popular image enhancement method. The model reversely induces the physical parameters of a shooting scene according to the backscatter situation of the image, makes a physical explanation for the process of backscatter removal, and solves the problem by solving the inverse process of the physical method, making the image restoration effect more natural.

2. The method of the present invention innovatively explains the relationship between the position of the light source and the backscatter, and solves the problem of image de-scattering under non-uniform illumination.

3. The method of the present invention is superior to the existing algorithm in de-scattering, and the performance is stable, and especially when the image has strong scattering, the effect is more prominent.

DESCRIPTION OF DRAWINGS

FIGS. 7A-7F show change situations of pixel values about the change of $\theta_A$;

DETAILED DESCRIPTION

Figure 1:
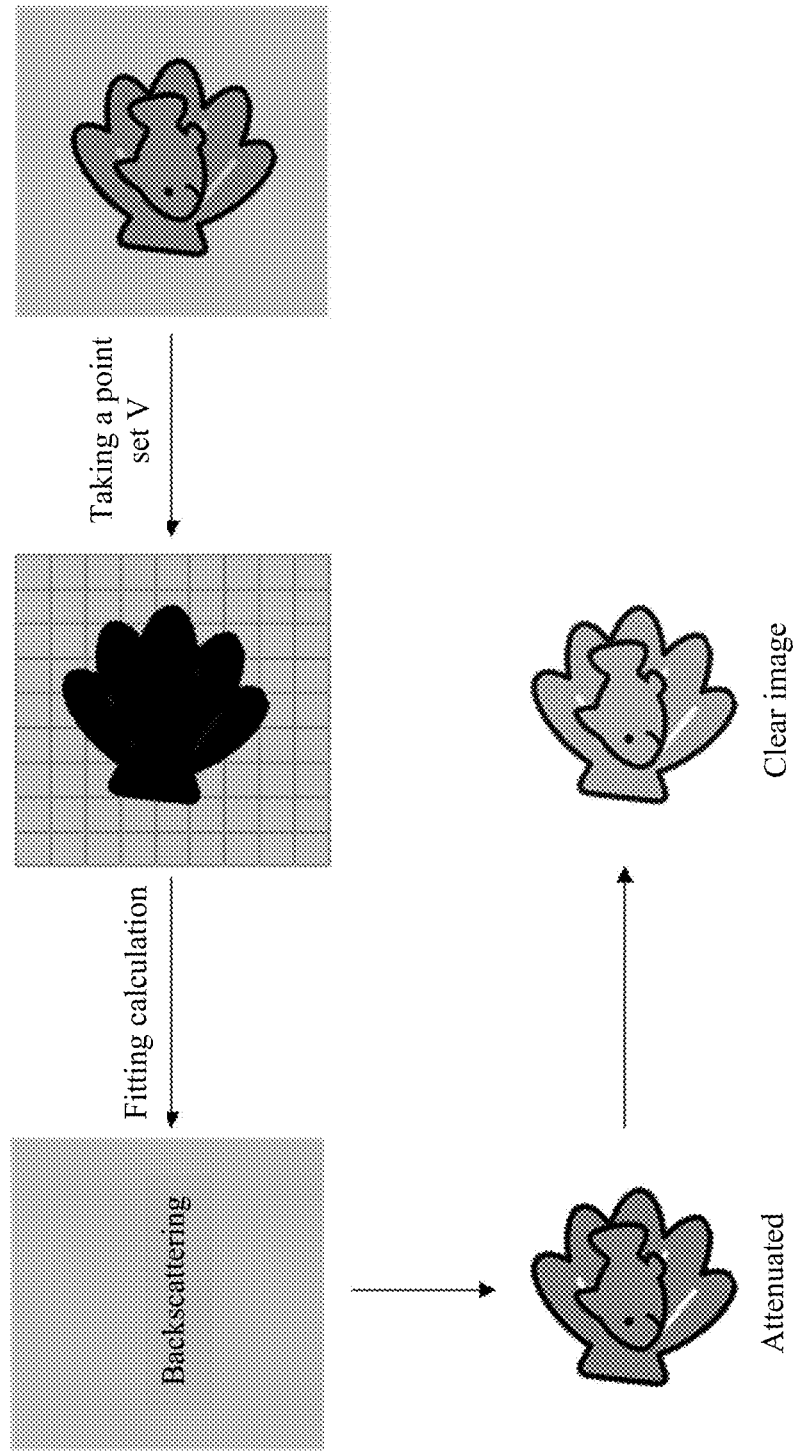
FIG. 1 is a flow chart of an image restoration method of a physical model for physical parameter scattering.

The present invention will be further described in detail below in combination with the embodiments. The method steps are described with reference to the drawings.

A scattering model based on physical parameters comprises the following steps:

1. calibrating camera vignetting and removing image noise by using a uniform light source (such as an integrating sphere);

2. establishing a mathematical model of de-scattering, dividing the attenuated image into two parts: direct radiance and backscatter, and calculating the two parts respectively;

3. performing point sampling on the collected images, and performing partial pixel fitting and parameter calculation for pure scattering;

4. removing backscattering and attenuation from the entire image by using the calculated parameters.

Calibrating vignetting comprises:

Establishing a de-vignetting table corresponding to settings including all focal lengths of the camera; and using a look-up table method for the image to be processed, and using the corresponding de-vignetting table to remove vignetting. Vignetting is a position-dependent illumination attenuation phenomenon that is unavoidable for all camera lenses. In general, vignetting is caused when a light beam passing through an aperture from an object point on an optical axis is larger than an imaging light beam of an off-axis object point. Vignetting removal cannot be verified in practice by the ideal fourth cosine law, so there are many approximation work for similar curves and improvement work on the fourth cosine law. Herein, a look-up table (LUT) method is used to eliminate vignetting. This operation should be done in a dark room, and a uniform light source with low specular reflection and known input intensity is arranged. An integrating sphere with a diameter of 1000 mm is used, with built-in 12 lamps, and the diameter of a light outlet is 100 mm to ensure that the light source is uniform. The correction factor at each pixel position is:

$$I_{LUT}(i, j) = \frac{I_{ref,max}}{I_{ref}(i, j)} \quad (3)$$

where $I_{ref}(i, j)$ represents a pixel value at position (i, j); $I_{ref,max}$ represents the maximum value of $I_{ref}(i, j)$; and $I_{LUT}(i, j)$ represents the correction factor at coordinate (i, j). The correction factors at all positions are calculated and combined into the de-vignetting table. Then, images shot with the same camera settings can be corrected by using the look-up table method:

$$I'(i,j) = I(i,j) I_{LUT}(i,j) \quad (4)$$

where I(i, j) represents the input intensity value at pixel (i, j), and I'(i, j) represents the output intensity value after vignetting correction of the pixel.

Backscatter is an optical effect caused by the random scattering of light directly through the suspended particles in the scattering medium to reach the camera lens without being reflected by an object. The direct radiation component is an optical effect caused by light reflected by the surface of the object and then scattered by suspended particles in the scattering medium to reach the camera lens.

The de-scattering mathematical model comprises:

1. Overview of Non-Uniform Illumination

Figure 2A:
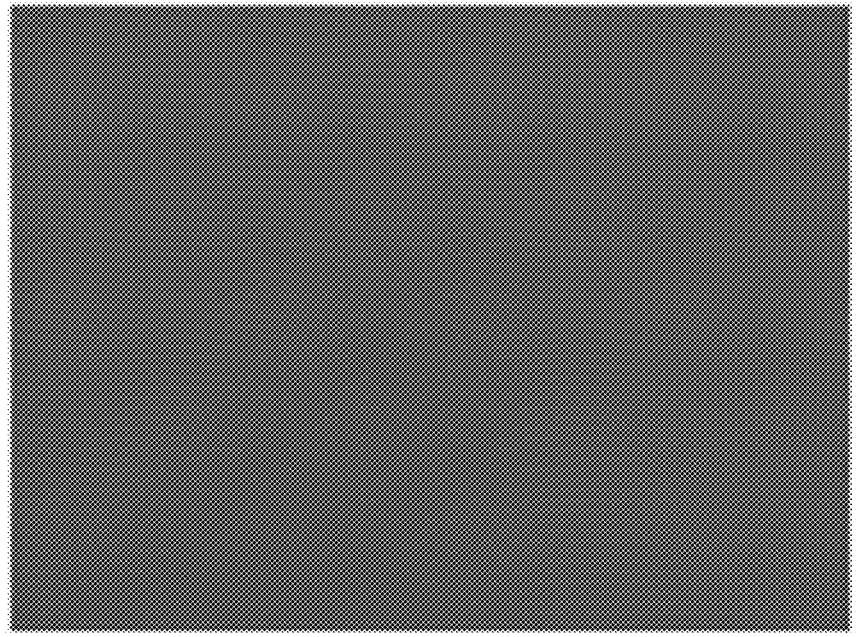
FIGS. 2A-2H show images shot with pure scattering and without object.
Figure 2B:
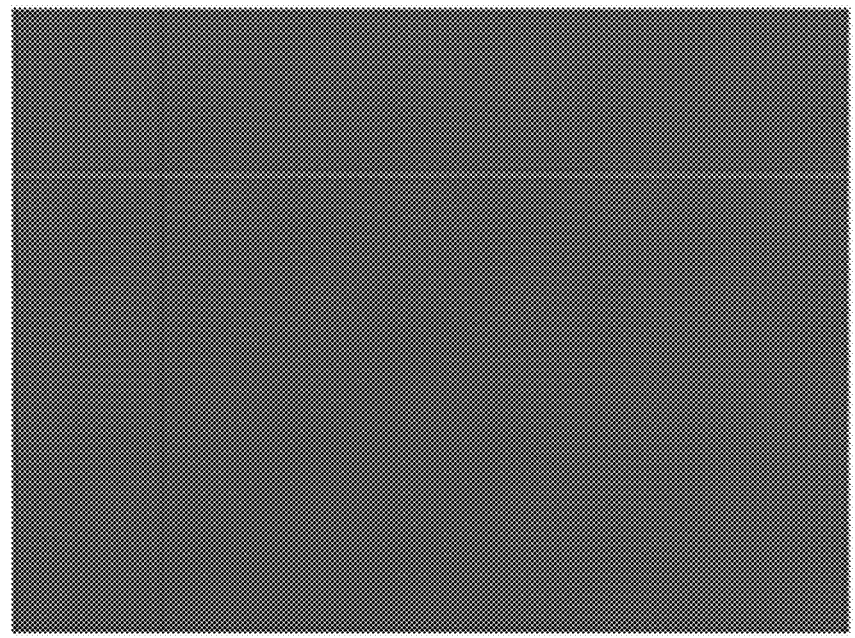
Figure 2C:
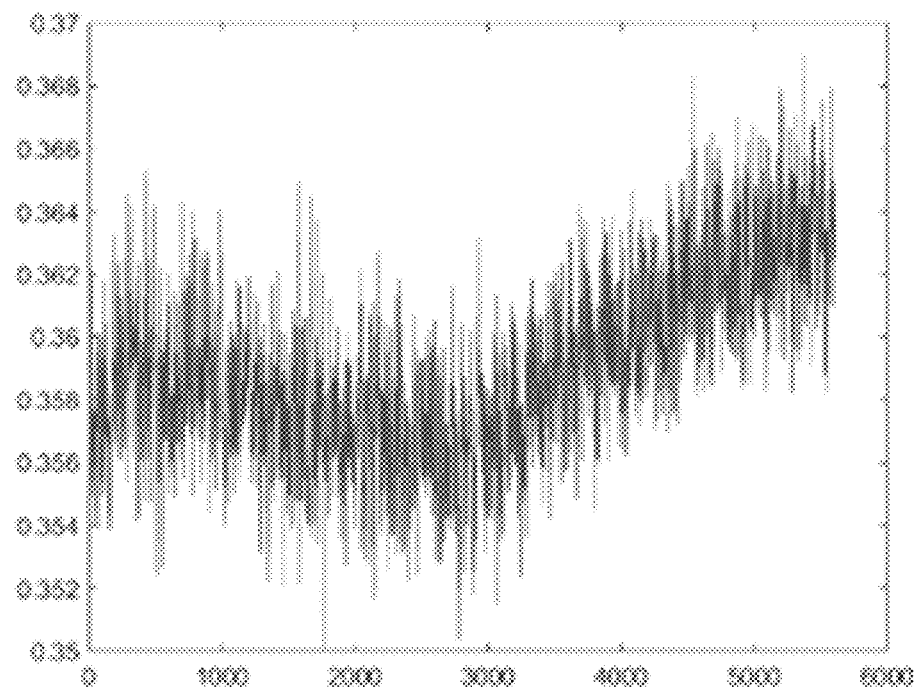
Figure 2D:
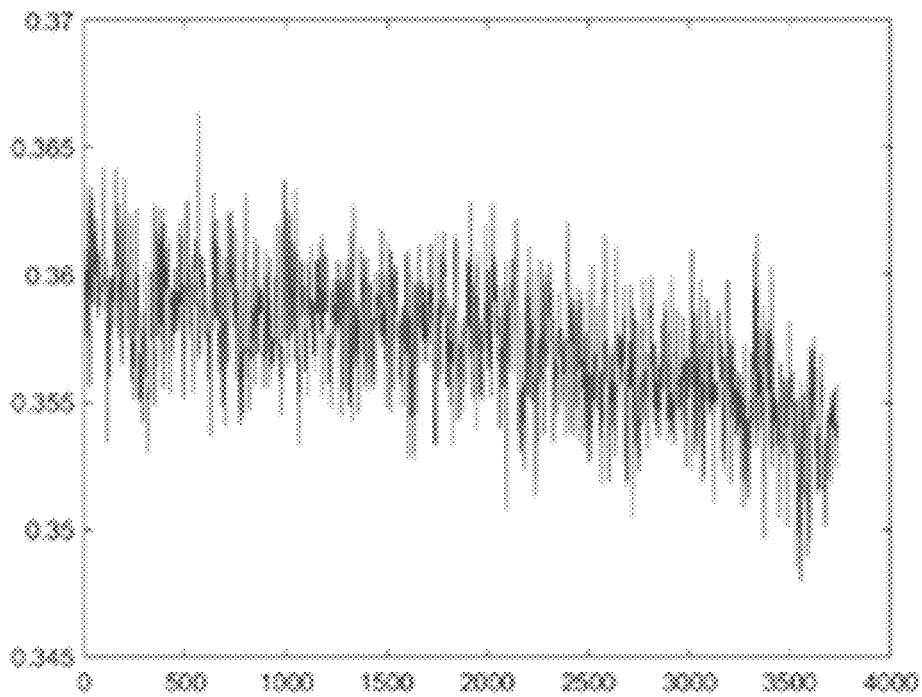
Figure 2E:
Figure 2F:
Figure 2G:
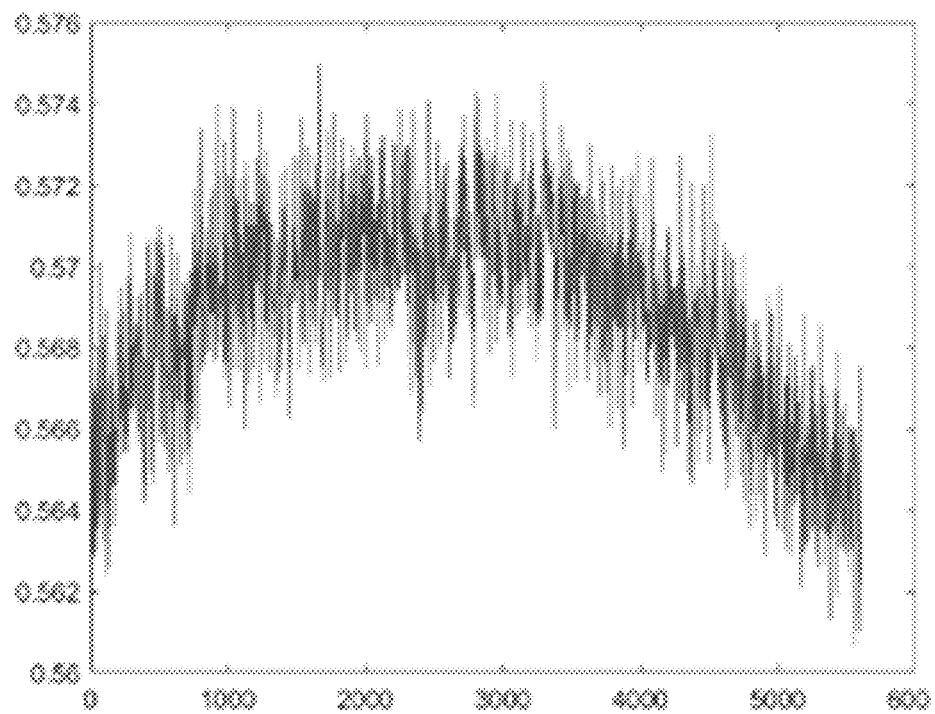
Figure 2H:
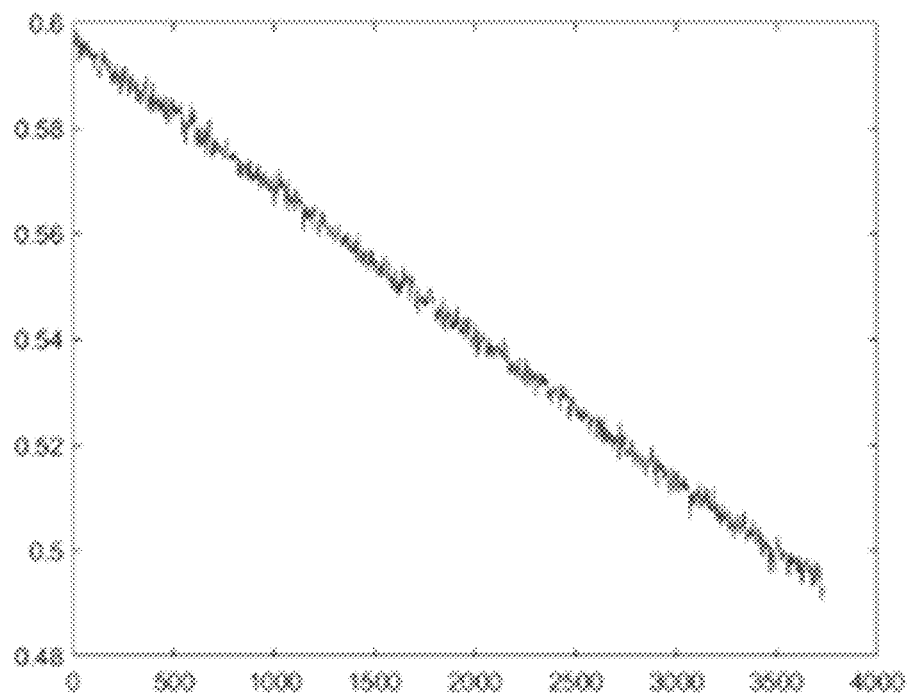

FIGS. 2A and 2E show two pure scattering object-free images taken underwater. In terms of atmospheric light scattering, the curve shapes of the two lines marked should tend to be constants. However, as shown in FIGS. 2A to 2H, the curve shapes of the marked pixel values are strongly related to the position of the light source. For vertical lines FIGS. 2D and 2H as marked in FIGS. 2B and 2F, the pixel values are decreased as the ordinate is decreased because the light source is farther from the position with the larger ordinate. For horizontal lines FIGS. 2C and 2G as marked in FIGS. 2B and 2F, the conditions are more complicated. We found that when an angle between a shooting direction on the earth plane and a light source direction is $k\pi(k=1, 2, 3 \ldots)$, the shape of the curve remains symmetrical about a central axis. When the angle between the shooting direction on the earth plane and the light source direction is $k\pi+\pi/2$ (k=1, 2, 3 \ldots ), the curve shape remains monotonically increasing or monotonically decreasing. When the shooting angle is between the above two situations, the pixel value of the curve will have a maximum value or a minimum value. The above problem can be simply summarized as the closer to the light source is, the higher the illuminance is and the larger the pixel value is. In addition, we also found that since light decays faster in denser media, this phenomenon becomes more severe as the turbidity of the medium increases. These problems are non-negligible, and problems may occur when depth estimation and image restoration are performed in denser media.

Figure 3A:
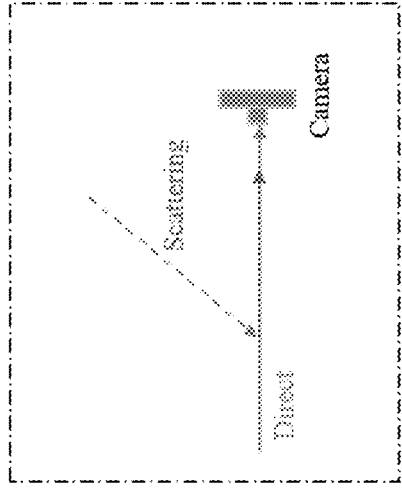
FIGS. 3A-3C show the cause of non-uniform illumination.
Figure 3B:
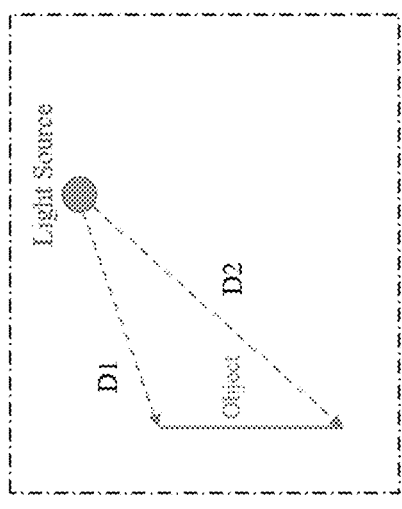
Figure 3C:
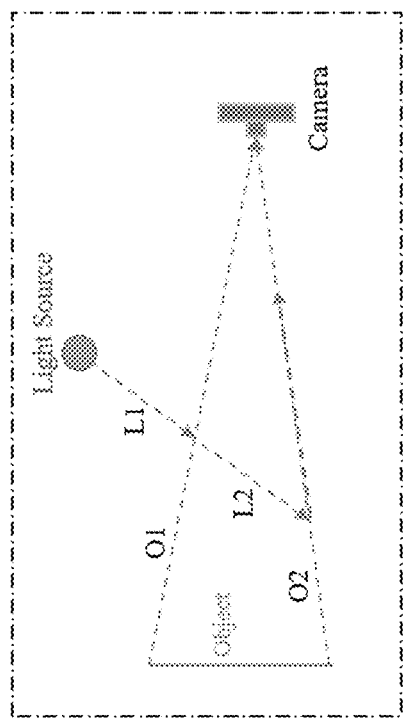

As shown in FIGS. 3A-3C, light propagation results in nonuniformity of illumination and intensity. FIG. 3A shows that the light received by the camera has two parts: the direct attenuation part of the object and the scattering part of the light source. However, the image formation models based on the atmospheric light scattering model do not consider light transmission from the light source to the object. As shown in FIG. 3B, light $D_2$ travels a longer distance than light $D_1$, which means that light $D_2$ attenuates more severely. The atmospheric light scattering model also assumes that the scattered light is parallel and travels equal distances to the scattering point. However, as shown in FIG. 3C, the scattered rays from the light source to the scattering points (L1 and L2) are also different at different camera viewing angles (O1 and O2). Two real factors reflected in FIGS. 3B and 3C cause that the illumination is actually uneven.

2. Model Establishment

A charge-coupled device (CCD) of the camera is used as the origin of a world coordinate system. x axis and y axis on the image plane are parallel to X axis and Y axis of the world coordinate system, and Z axis is aligned with the optical axis of the camera. The point $x=(x_0, y_0)$ on the image plane is made to correspond to the point $X=(X_0, Y_0, Z_0)$ on the surface of the object, and the relationship therebetween is $$(X_0, Y_0, Z_0) = \left(\frac{Z_0}{f}x_0, \frac{Z_0}{f}y_0, Z_0\right),$$

where f represents the focal length of the camera.

Then, for a point (x, y) on an image coordinate system, its corresponding coordinates on the world coordinate system can be expressed as:

$$(X, Y, Z) = \left[\frac{(x-x_0)w_x}{f} \cdot Z, \frac{(y-y_0)w_y}{f} \cdot Z, Z\right] \quad (5)$$

where $x_0$ and $y_0$ are the center coordinates of the image, $w_x$ and $w_y$ are the physical dimensions of the pixel calculated according to the CCD width, and f is the focal length.

A single scattering model is used, and forward scattering is ignored. Thus, the radiation amount which reaches the camera can be divided into direct radiation and backscatter:

$$I^c(x) = I_d^c(x) + I_b^c(x), c \subset \{R,G,B\} \quad (6)$$

where $I_b$ is the backscatter, and $I_d$ is the direct radiation component. Therefore, the backscatter intensity and attenuation for each pixel are accurately calculated to obtain a clear image.

According to the Beer-Lambert law, light is considered to decay with a distance from the exiting point of light to a lens, and the propagation of light is related to an extinction coefficient. The extinction coefficient varies based on the wavelength of light. In water, visible light decays at a longest wavelength and finally appears blue to the human eye; and red light tends to decay faster than green and blue light, so the extinction coefficients for different channels should not be the same. In addition, when sunlight is illuminated from a distance, the scattered part in each direction should also be considered, which is determined by a phase function and a scattering coefficient.

3. Direct Radiation Component

For a point $x=(x_0, y_0)$ on the image plane, it is assumed that this point corresponds to the coordinate $X=(X_0, Y_0, Z_0)$ on the object in the world coordinate system. Then for this point, the direct radiation component is:

$$E^c = \frac{I_0}{[\tau D(X)]^2} \quad (7)$$

where $\|D(X)\|$ represents a distance the light travels to the object, $I_0$ represents the radiation intensity of the light source before entering the scattering medium, and c represents a color channel. The distance $\|D(X)\|$ comprises a distance $\|\tau D(X)\|(0 \leq \tau \leq 1)$ in water and a distance $\|1-\tau D(X)\|$ in air. After that, the light is reflected by the object with a reflectivity of $\rho^c(X)$, and reaches the camera lens through a distance $\|X\|$. After all the processes, the direct irradiance reaching the camera lens can be written as:

$$I_d(x) = E^c e^{-\sigma(\|\tau D(X)\| + \|X\|)} \tag{8}$$

Figure 4:
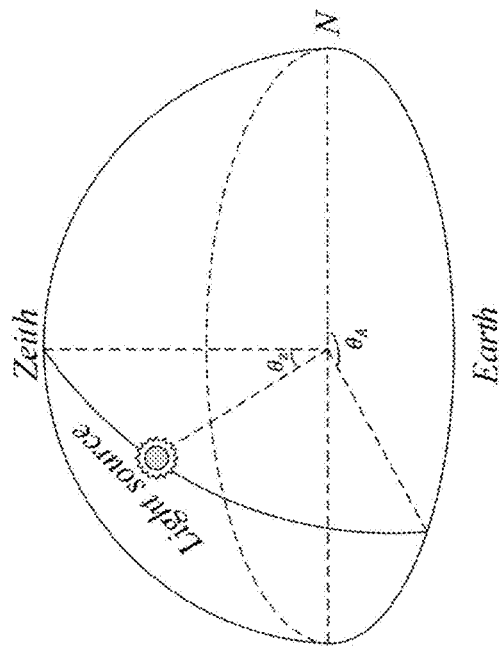
FIG. 4 is a zenith angle and an azimuth angle of a light source.
Figure 5:
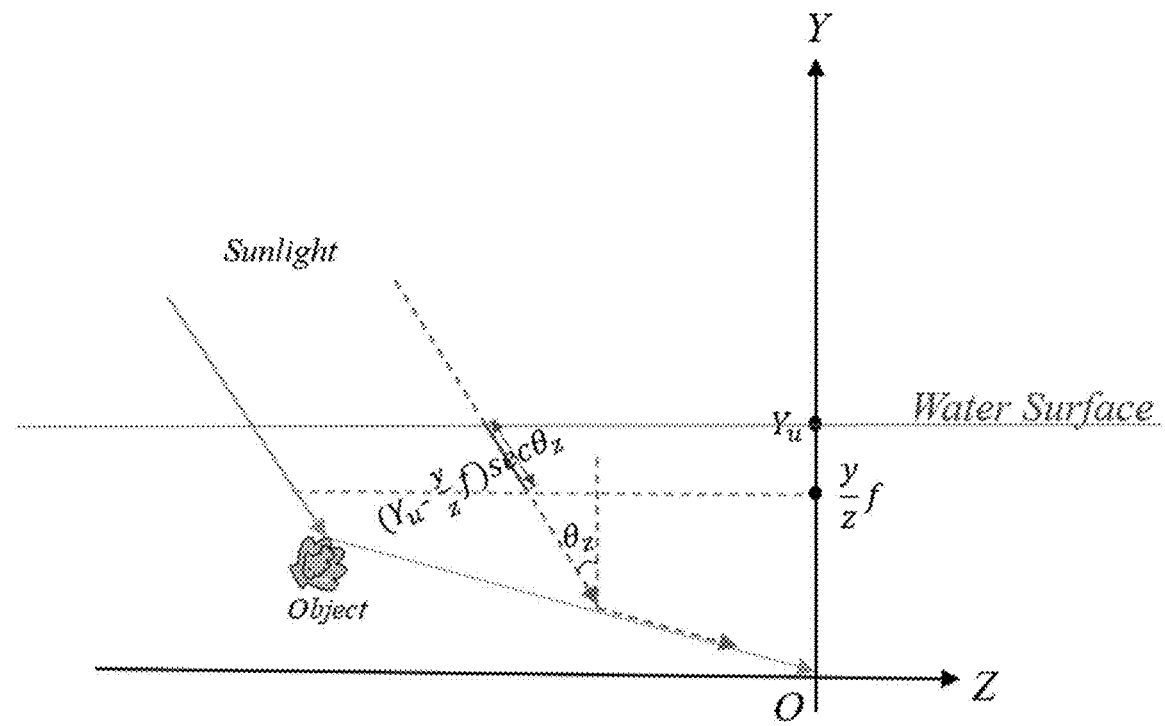
FIG. 5 shows relevant calculation parameters of backscattering.

$Y_u$ is set as a distance from the camera to the horizontal plane. As shown in FIG. 5, considering a zenith angle $\theta_Z$ shown in FIG. 4, the propagation distance of light before being reflected by an object in water is equal to:

$$\tau D(X) = \left(Y_u - \frac{y}{f}Z\right)\sec(\theta_Z) \tag{9}$$

$r(x, y)$ is made to be equal to the distance $\|X\|$ from the object to the camera lens, to obtain:

$$r(x, y) = \sqrt{\left(\frac{x}{f} \cdot Z\right)^2 + \left(\frac{y}{f} \cdot Z\right)^2 + Z^2} \tag{10}$$

$$L_d^c(x, y) = E^c e^{-\sigma\left[\left(Y_u - \frac{y}{f}Z\right)\sec(\theta_Z) + r\right]} \rho^c(x, y) e^{-\sigma r(x,y)} \tag{11}$$

Finally, the direct radiation component can be represented by physical parameters:

$$I_d^c(x) = J^c(x) e^{-\sigma^c\left[\left(Y_u - \frac{y}{f}Z\right)\sec(\theta_Z) + r\right]} \tag{12}$$

where $J^c(x)$ represents a clear image, and r represents a distance from a pixel $r(x, y)$ to the origin.

When the light source is in a scattering medium, $Y_u$ refers to a distance from the object to the light source; otherwise, $Y_u$ refers to a distance of the object to the horizontal plane or to the top of the atmosphere.

4. Backscattering Component

Backscatter is an optical response caused by that the light is not reflected by the surface of the object and is only scattered to the camera lens by a medium and then subjected to small-angle random scattering by suspended particles in water. A phase function is used to describe the scattering degree of light in a particular direction, and a scattering coefficient $\beta$ is used to represent the scattering degree of light. In terms of the phase function, the most classic is the Heyney-Greenstein phase function, which can be represented by two parameters of molecular anisotropy g and the scattering angle $\alpha$, and the relative amounts of forward scattering and backscattering are described by $g \in (-1, 1)$:

$$P(g, \alpha) = \frac{1}{4\pi} \cdot \frac{1 - g^2}{[1 + g^2 - 2g\cos\alpha]^{\frac{3}{2}}} \tag{13}$$

where the value range of the scattering angle $\alpha$ is $[0, \pi]$, which is the angle between the direction of an object point and the direction of the light source:

$$\cos\alpha = u \cdot \hat{X} \tag{14}$$

$$X = \left(\frac{Z}{f}x, \frac{Z}{f}y, Z\right) \tag{15}$$

$$u = [\sin(\theta_Z)\sin(\theta_A)\cos(\theta_Z)\sin(\theta_Z)\cos(\theta_A)] \tag{16}$$

where $\theta_Z$ represents a zenith angle and $\theta_A$ represents an azimuth angle.

According to the principle $u \cdot X = \|u\|\|X\|\cos \alpha$, the scattering angle can be expressed as a real physical quantity:

$$\cos(\alpha) = \frac{\sin(\theta_Z)\sin(\theta_A)X + \cos(\theta_Z)Y + \sin(\theta_Z)\cos(\theta_A)Z}{\sqrt{X^2 + Y^2 + Z^2}} = \tag{17}$$

$$\frac{\sin(\theta_Z)\sin(\theta_A)x + \cos(\theta_Z)y + \sin(\theta_Z)\cos(\theta_A)f}{\sqrt{x^2 + y^2 + f^2}}$$

According to formula (10), the formula is obtained:

$$dr = \sqrt{(dX)^2 + (dY)^2 + (dZ)^2} \tag{18}$$

$$= \sqrt{\left(\frac{dX}{dZ}\right)^2 + \left(\frac{dY}{dZ}\right)^2 + 1} \cdot dZ$$

$$= \frac{1}{f}\sqrt{x^2 + y^2 + f^2} \cdot dZ$$

Backscatter is obtained by integrating the depth from the camera to the scattering point:

$$L_b^c(x) = \int_0^{Z_s} E^c e^{-\sigma^c d_x} \beta^c P(g, \alpha) e^{-\sigma^c r} dr \tag{19}$$

where $Z_s$ represents depth, $\beta^c$ represents an extinction coefficient, and $\sigma^c$ represents a scattering coefficient. The formula is simplified to make $$\eta = \frac{1}{f}\sqrt{x^2 + y^2 + f^2},$$

$M^c = E^c \beta^c$ to obtain the backscattering component below, which is formed by focal length, scattering angle, depth, and extinction coefficient.

$$L_b^c(x, y) = E^c e^{-\sigma^c Y_u \sec(\theta_Z)} \beta^c P(g, \alpha) \eta \int_0^{Z_s} e^{-\sigma^c\left[-\frac{y}{f}\sec(\theta_Z) + \eta\right]Z} dZ = \tag{20}$$

$$\frac{M^c e^{\sigma Y_u \sec(\theta_Z)} f\eta}{\sigma} P(g, \alpha) \frac{1 - e^{-\frac{\sigma}{f}[f\eta + y\sec(\theta_Z)]Z_s}}{[f\eta + y\sec(\theta_Z)]}$$

The pixel fitting and parameter calculation comprise:

According to formulas (6), (12) and (20), the formula for a clear image can be obtained:

$$J^c(x) = \frac{I^c(x) - L_b^c(x, y)}{e^{-\sigma^c\left[\left(Y_u - \frac{y}{f}Z\right)\sec(\theta_Z) + r\right]}} \tag{21}$$

where $I^c(x)$ is the input image to be restored, $L_b^c(x, y)$ is a backscattering item and $$e^{-\sigma^c\left[\left(Y_u-\frac{Y}{f}Z\right)\sec(\theta_Z)+r\right]}$$

is a direct radiation item.

After the vignetting in the image is removed, the image plane coordinates are transformed into a real coordinate system for the calculation of de-scattering. The image is sampled with a step size of 50 pixels, and a method similar to a dark channel prior is used for the sampling points to find the part where the direct radiance is close to 0, which is set as a set V. For the set V, unknown parameters $M^c$, $\sigma$, $Y_u$, $\theta_z$, f, $\theta_z$, $\theta_A$, $Z_s$ in the formula are calculated by an optimal fitting method. Finally, the backscattering part on the entire image is calculated through the obtained parameters, the backscattering item is subtracted, and the result is divided by the attenuation item to obtain a final result.

1. Experimental Preparation

Figure 6:
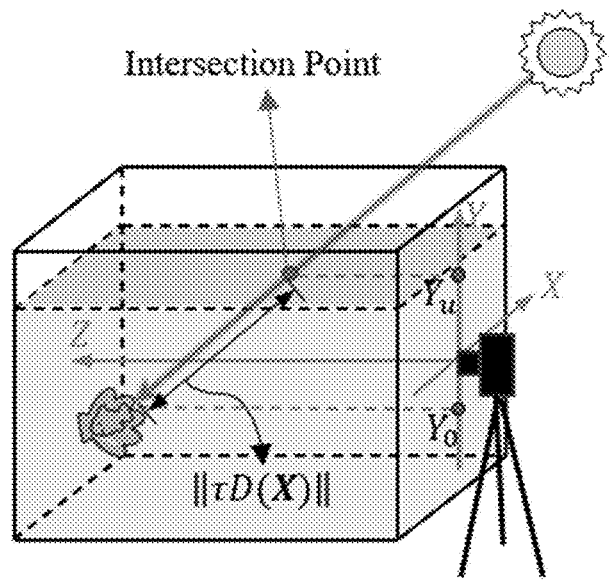
FIG. 6 is an experimental environment.

To verify the accuracy of the model, an experimental environment can be arranged as shown in FIG. 6. A water tank filled with scattering media (diluted milk) is used for the experiment. The light source is the sun, and a water tank with a size of 90×90×45 cm is used, which is filled with clean water. Milk is added to the water tank to increase the turbidity of the scattering environment for several times. Experiments are designed to test and verify our image restoration model. Since the equations are related to the actual physical values, the following settings can be made to avoid the interference of objective factors on the calculation of physical parameters:

Except for the side where a lens is placed, a black shading cloth is used to block all the inside and outside surfaces of the water tank, including the bottom surface of the water tank, to prevent calculation interference caused by the reflection of sunlight in the glass.

A compass is used to calibrate the direction of the water tank so that the north-south direction of the water tank is parallel to the north and south poles of the earth's axis; and the water tank is put on a level roof to prevent calculation inaccuracy of the zenith angle.

After the milk is put, the solution is stirred evenly, stood and then shot after the water surface is still.

The functions of the camera, such as automatic light supplement, automatic adjustment and peripheral light correction are turned off, and the most original raw data are used for processing.

When pictures are shot, water droplets that are adsorbed on the glass surface on the shooting side are removed or avoided as much as possible.

When pictures are shot, the camera is held horizontally and prevented from tilting as much as possible; otherwise, the calculation of parameters such as the direction angle may be inaccurate.

2. Experimental Process 2.1 Software Environment Configuration

The configuration of a computer platform in this experiment is: CPU processor Intel® Core™ i9-10900K CPU @ 3.70 GHz, a cache of 32G, and a graphics card Nvidia GeForce RTX2080 SUPER. A software environment is Windows 10 Professional Edition. A software development environment in the experiment is Matlab2020b.

2.2 Parameter Calculation

To calculate the backscattering component $I_b$, some regions with pixel values close to the backscattering values and the direct radiation component equal to 0 need to be found.

$$I_d^c(x)=0 \tag{22}$$

$$I^c(x)=I_b^c(x), c \in \{R,G,B\} \tag{23}$$

Therefore, some pixels that only contain scattering components and have similar depths need to be extracted to estimate physical parameters. Thus, firstly, the input image is converted from RGB space to HSV space, and saturation channels and intensity channels are extracted. Then, the optimal global threshold is calculated by using graythresh function in Matlab, i.e., the OSTU maximum between-class variance method, and some regions with high intensity and saturation are extracted. In these regions, further sampling at 50-pixel intervals in the x and y directions of the image is conducted to generate a point set V. For each point belonging to V, the minimum value of five adjacent pixel regions is taken as follows.

$$J^c(x) = \min_{y \in \Omega(x)} (I^c(x)), x \in V \tag{24}$$

Formula (24) is inspired by the dark channel prior method proposed by He et al. The difference is that the present invention does not extract the minimum value of different color channels, because the calculation can be adapted to more light source types. In addition, to ensure that the points used for the calculation contain only the backscattering item, i.e., $J^c(x) \approx 0$, the modified DCP-like rule is used on the point set V, rather than used on the entire image.

2.3 Curve Fitting

The corresponding computational physical parameters are calculated by using the extracted regions which contain only backscattering. The backscattering item proposed in formula (20) contains eight parameters $M^c$, $\sigma^c$, $Y_u$, g, f, $\theta_z$, $\theta_A$, $Z_t$. Theoretically, for an equation with eight parameters, the analytical solutions of all parameters can be calculated by taking ten or more points. However, it is difficult and time-consuming to solve one by one, and the point selection is greatly affected by noise, so fitting is a more time-saving method. Because too many factors of underwater disturbance lead to a lot of noise, and there are too many parameters, the solution of the equation is easily shifted in the fitting process and it is necessary to optimize the parameters. In the fitting calculation, each parameter has three corresponding values, which are an initial value, an upper fitting limit and a lower fitting limit. It is especially important to choose the right starting point.

In the experiment, the milk is used as a scattering medium. According to the calculation of the anisotropy parameters of the milk in previous work, the value range of g can be roughly reduced from [−1, 1] to [0, 1]. Because the amount of dripping milk is much smaller than the volume of the water tank, the initial value of g can be set to a smaller value of 0.1. As shown in the figure, g mainly affects the slope along a vertical axis in three-dimensional coordinates, which is reflected in a brightness difference and gradually changes with the increase of water depth.

TABLE 1

| Parameter | M | $Y_u$ | $\sigma$ | f | g | $\theta_A$ | $\theta_Z$ | $Z_t$ | x | y | z |
|---|---|---|---|---|---|---|---|---|---|---|---|
| Value | 64.53 | 120 | 0.0008056 | 95.49 | 0.2837 | 0.3787 | 40.04 | 978.8 | | | |
| range | + | + | [0, 1] | 105 | — | 30 | 45 | 800 | $[0, X_s]$ | $[0, X_s]$ | + |

By using a control variable method, a mathematical relationship obtained by substituting the parameters shown in Table 1 into the backscattering function can be known. $\theta_A$ represents an azimuth angle from the light source to the camera, which mainly controls the tilting of the pixel value in the x-axis direction. As shown in FIGS. 7A-7C, when $\theta_A$ of two functions is symmetric about 180°, the pixel value z is symmetric about $x=x_s/2$, and tilting directions are also different between [0, π] and [0, π]. $x_s$ is a maximum value in the image coordinate system. Mathematical derivation is as follows.

The function is defined:

$$f(x, \theta_A) = \cos(\alpha) = \frac{\sin(\theta_z)\sin(\theta_A)x + \cos(\theta_z)y + \sin(\theta_z)\cos(\theta_A)f}{\sqrt{x^2 + y^2 + f^2}} \quad (25)$$

Then $$f(-x) = f(2\pi - \theta_A) \quad (26)$$

A phase function is:

$$P(\alpha) = \frac{1}{4\pi} \cdot \frac{1 - g^2}{[1 + g^2 - 2gf(x)]^{\frac{3}{2}}} \quad (27)$$

Obviously, $$P(-x) = P(2\pi - \theta_A) \quad (28)$$

However, in formula (20), the phase function is the only part that contains x and $\theta_A$, and thus is a function of backscattering.

$$L_b(-x) = L_b(2\pi - \theta_A) \quad (29)$$

Because formula (20) takes the image center as a coordinate origin, and a first pixel in the image is usually used as the coordinate origin in calculation, the above formula can be changed to $$L_b(x_s - x) = L_b(2\pi - \theta_A) \quad (30)$$

Figure 7D:
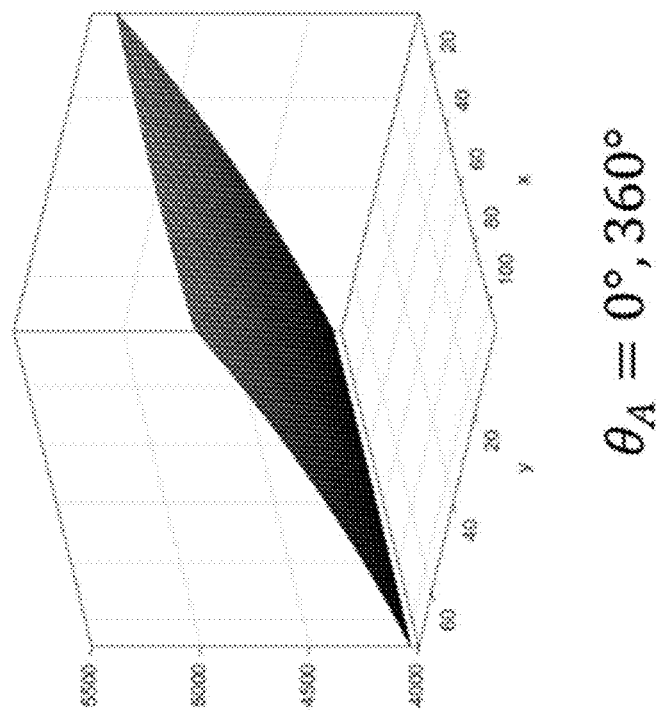
Figure 7C:
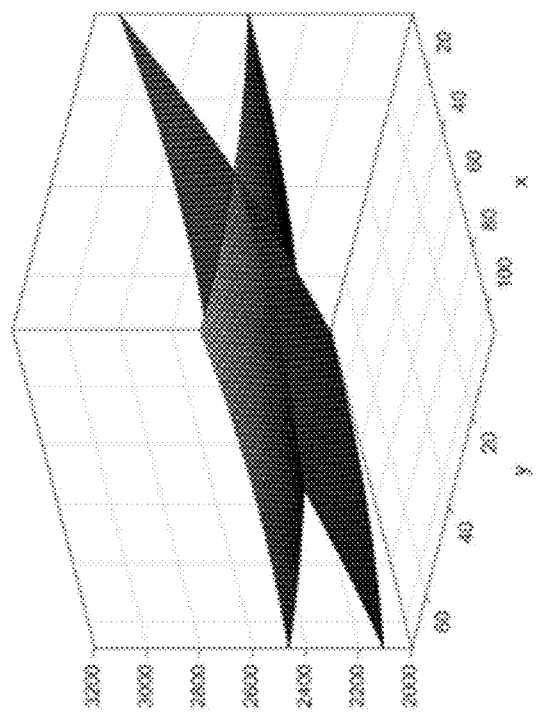

In addition, as shown in FIGS. 7D-7F, when $\theta_A = k\pi$, the overall image pixel value is symmetric about $x=x_s/2$. Thus, theoretically, for the same image, $\theta_A$ has only one solution. In fitting, the value of $\theta_A$ should be set between 0° and 360°; the initial value should be set in steps of 10° with traversing of 10°-350°; the lower limit should be set in steps of 10° with traversing of 0°-340°; and the upper limit should be set in steps of 10° and traversing of 20°-360°. All fitted values in the traversing process are compared to determine the interval and initial value of $\theta_A$.

Figure 8:
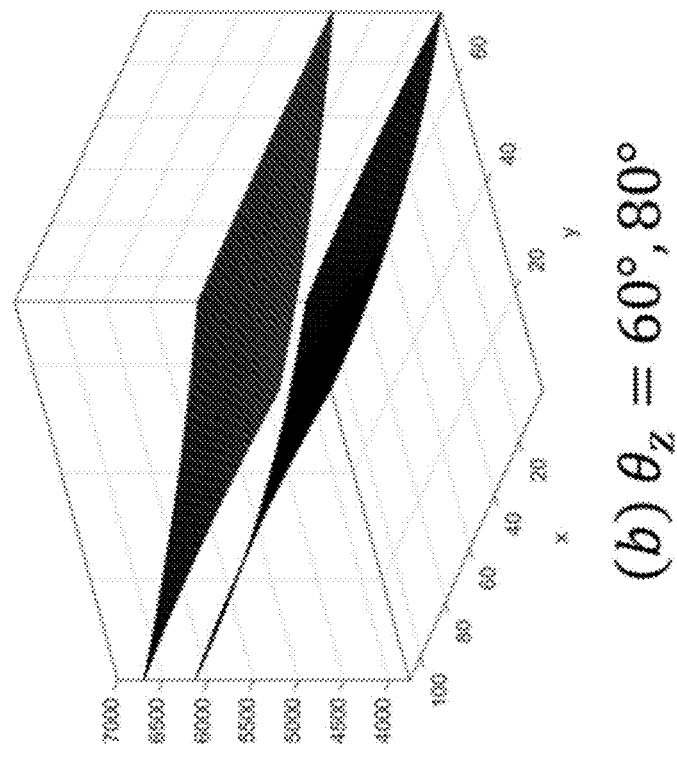
FIG. 8 shows change situations of pixel values about the change of $\theta_Z$.
Figure 8:
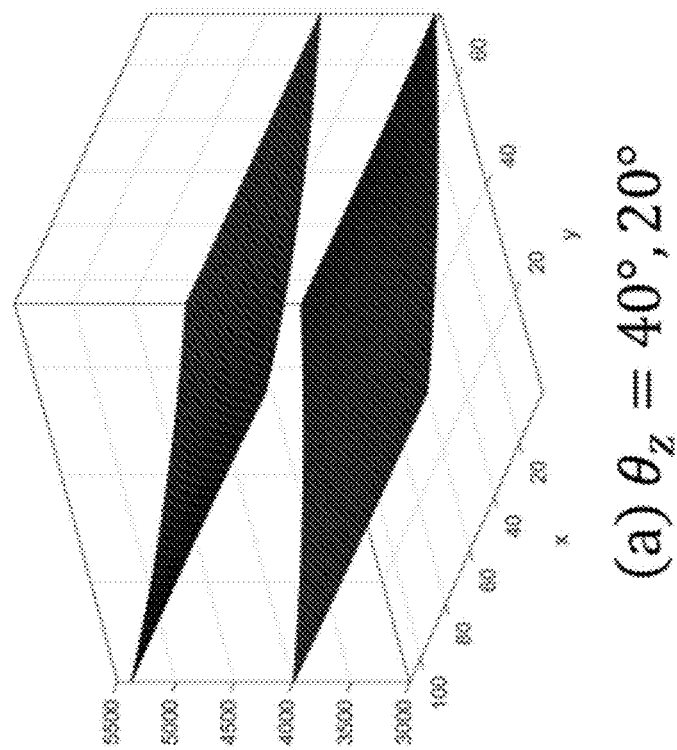

$\theta_Z$ represents the zenith angle of the light source. As shown in FIG. 8, the change of $\theta_Z$ mainly controls the change of the function amplitude. However, when $\theta_Z$ increases, a numerator and a denominator of the fraction in formula (20) are increased, so there is no qualitative relationship with $\theta_Z$ and the overall pixel value. In fitting, the value of $\theta_Z$ is between 0° and 90°; the initial value should be set in steps of 5° with traversing of 5°-85°; the lower limit should be set in steps of 5° with traversing of 0°-80°; and the upper limit should be set in steps of 5° and traversing of 10°-90°. All fitted values in the traversing process are compared to determine the interval and initial value of $\theta_Z$.

Figure 9A:
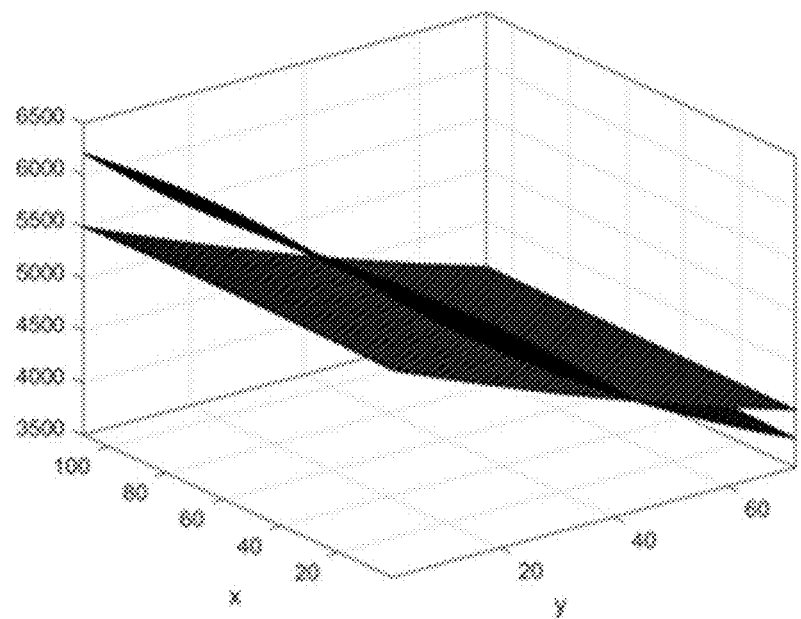
FIGS. 9A-9B show change situations of pixel values about the change of g, $\sigma$.
Figure 9B:
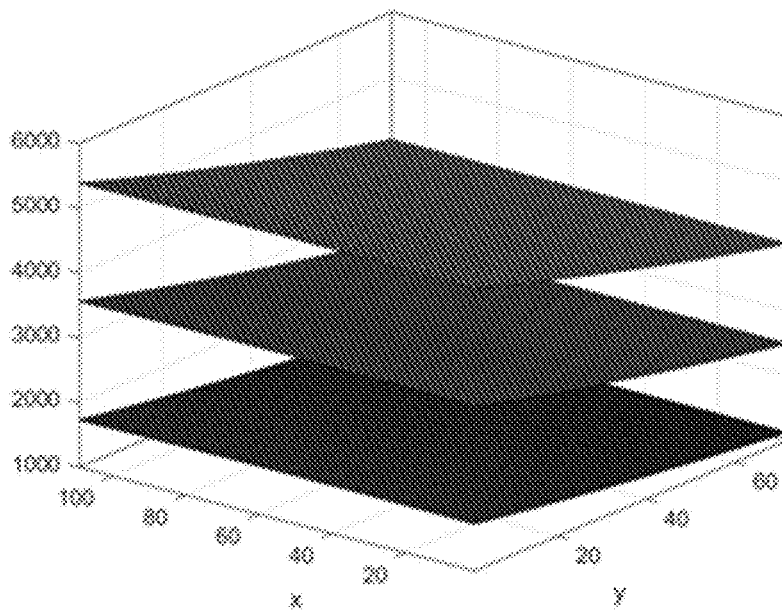

The parameters $\sigma^c$ and g are related to the scattering medium. Friscad et al. proposed a theoretical model to calculate the scattering properties of participating media, and Narasimhan et al. measured the scattering parameters of 40 common materials, including g, by increasing the concentration of diluted media. As shown in FIG. 9A, g mainly affects the slope along z axis on the y-z coordinate plane. In fitting, the step size of traversing g is set as 0.1, and [0,1] is traversed to find the most suitable initial value. As shown in FIG. 9B, $\sigma^c$ represents an attenuation coefficient which varies with the overall amplitude of the function and hardly affects the gradient of $L_b$ to x, y, z. According to the research of Narasimhan and Jerlov, this value is generally in the order of 10-5/mm to 10-3/mm, so the initial value of this value can be set as the order of 10-4, the upper and lower limits are respectively 10-5 and 1, and the traversing step size is 0.0001.

Figure 10:
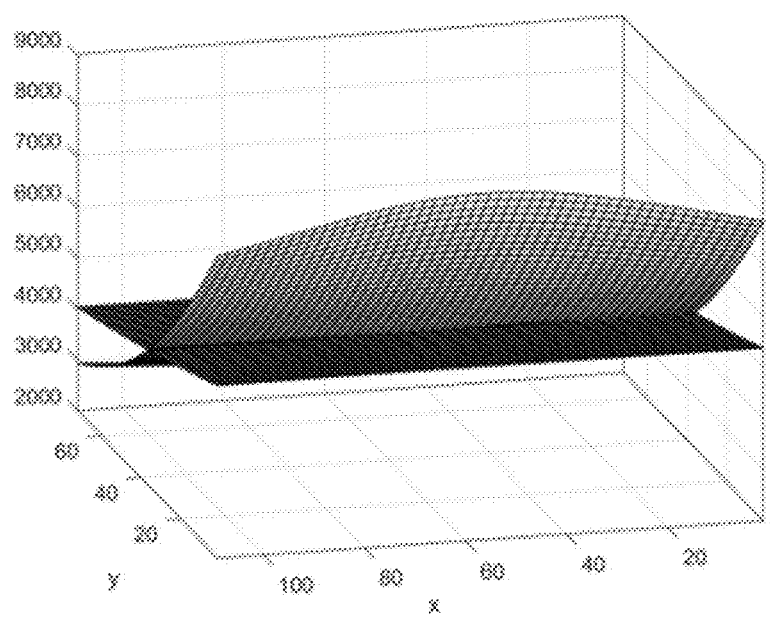
FIG. 10 is a change situation of a pixel value about the change of f.

The focal length f mainly controls the curvature on the x axis and y axis of the function, as shown in FIG. 10, which is reflected as the size of the gradient to y or z, and the difference between the maximum value and the minimum value of backscattering. This can be explained by the mechanism of camera shooting. When the camera does not move, the larger the focal length is, the narrower the field of view is, and the brightness changes in a curve. Thus, the change of the focal length will cause the change of the brightness difference in the image. For the camera Cannon 5D Mark2, the upper and lower limits of [24, 105] and the step size of 10 can be directly taken in all fitting calculation for fitting. In addition, direct reading from the EXIF tag of the pictures can be considered.

Figure 11:
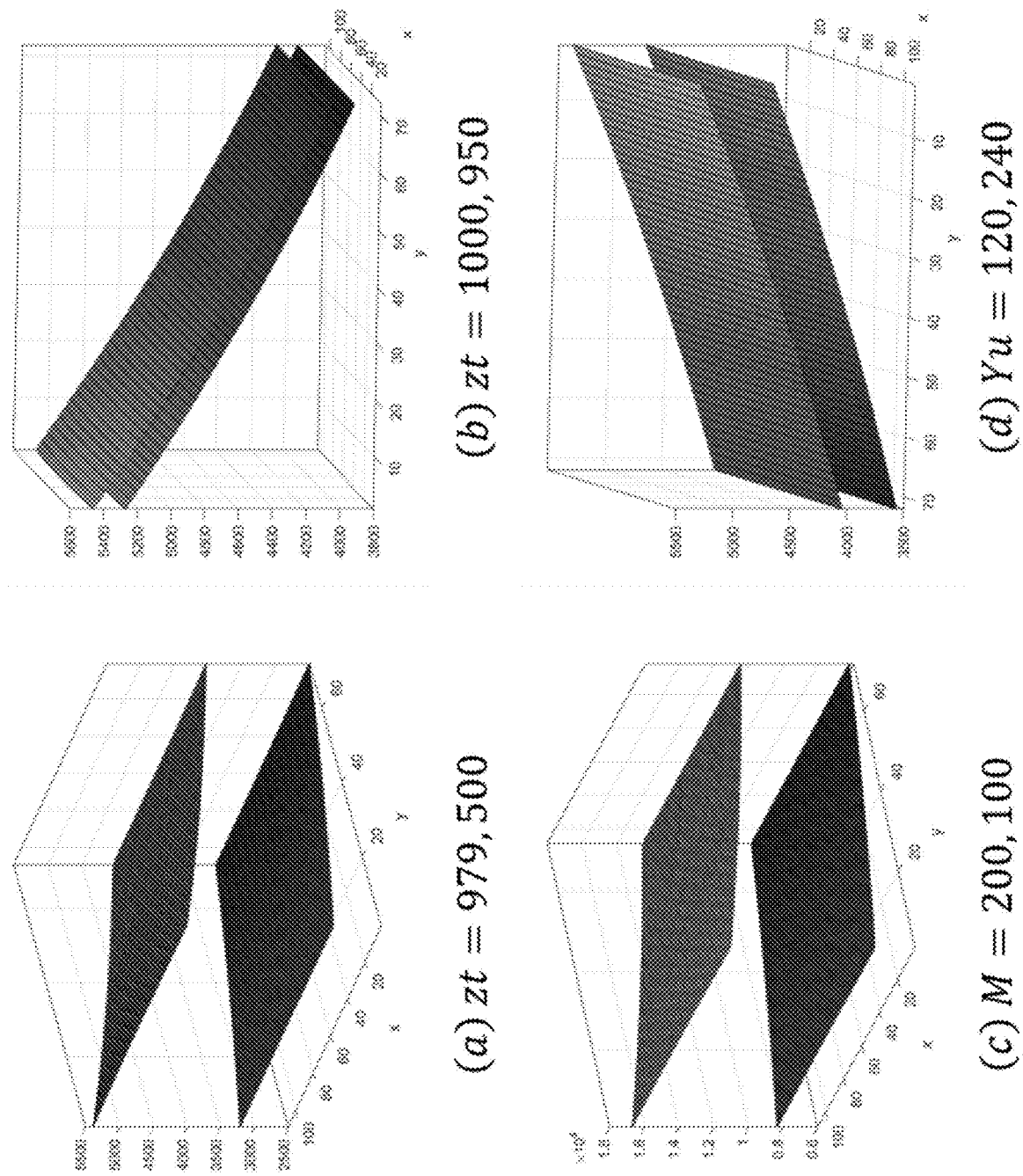
FIG. 11 shows change situations of pixel values about the change of $Z_t$, M, $Y_u$.

As shown in FIG. 11, the parameters $Z_t$, $Y_u$, M mainly affect the overall amplitude and rarely change the slope. $Z_t$ represents a depth from the object to the camera. The larger $Z_t$ is, the more turbid the entire image is, and the deeper the degree of backscattering is. M is usually not a large value, and its product with f is close to the value of the background light. In addition, the distance between the upper and the lower limits needs to be controlled to be large enough, to prevent the incapability of taking all high-fitting solutions.

In fitting, because different parameters have different effects on the functions, fitting priorities should be set. For parameters $M^c$, $Y_u$, $\sigma^c$, f, g, $\theta_A$, $\theta_Z$, $Z_t$, the priorities are set as [5 8 1 4 7 6 2 3] respectively, and fitting is conducted according to the priority order, so as to select a result with the highest fitting degree.

The overall algorithm process is provided in algorithm 1.

| Algorithm 1: Image restoration algorithm based on scattering model |
| --- |
| Input: Input the image I(x) to be restored.<br>Output: Clear image J(x).<br>1. Removing vignetting;<br>2. Conducting coordinate transformation;<br>3. Finding the point set V that only contains the backscattering part;<br>4. For the physical parameters $M^C$, $Y_u$, $\sigma^C$, f, g, $\theta_A$, $\theta_Z$, $Z_t$ in each channel;<br>5. Conducting parameter fitting according to formula (20) and estimating the parameter values;<br>6. Substituting the estimated parameter values back to formula (20) to calculate the backscattering value and the attenuation value of each point on the image;<br>7. Calculating and outputting the clear image. |

3 Fitting Results and Comparative Experiments

Figure 12A:
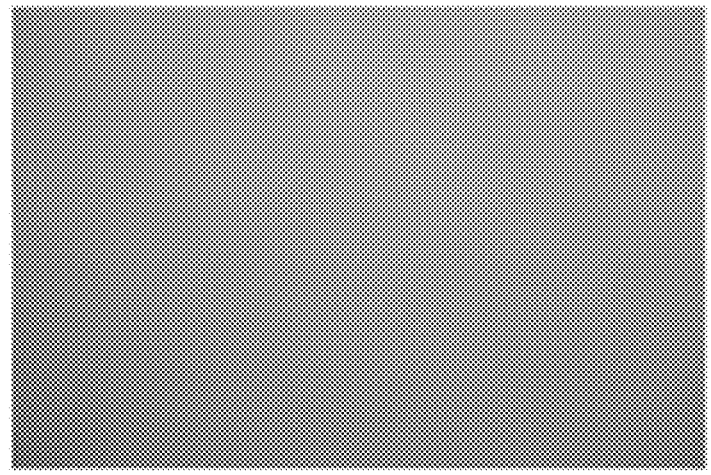
FIGS. 12A-12B are a restored image of a high scattering image corresponding to Table 2.

For an image with high scattering as shown in FIG. 12A, the contents of the objects inside are almost invisible to the naked eye. The actual physical parameters corresponding to the image are calculated as shown in Table 2:

TABLE 2

| Parameter | M | $Y_u$ | σ | f | g | $\theta_A$ | $\theta_Z$ | $Z_t$ |
| --- | --- | --- | --- | --- | --- | --- | --- | --- |
| Estimated value | 182.1 | 100 | 0.001477 | 95.49 | 0.3307 | 27.87 | 48.68 | 753.7 |
| Actual value | — | 100 | — | 105 | — | 30 | 45 | 800 |

Figure 12B:

The restored image is shown in FIG. 12B, and it can be clearly seen that the effect of the present invention removes a considerable concentration of scattering, and the estimated physical parameters are also very close to the actual values. This can verify the correctness of this model.

Figure 13:
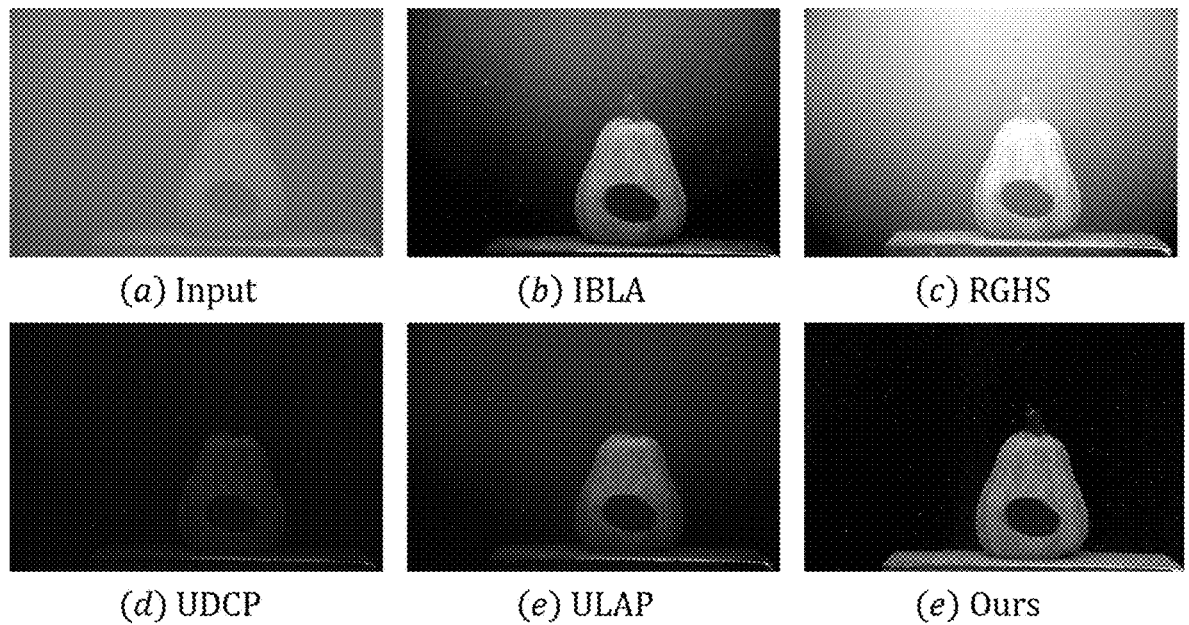
FIG. 13 shows comparative experiment results of the present invention and other methods.
Figure 13:
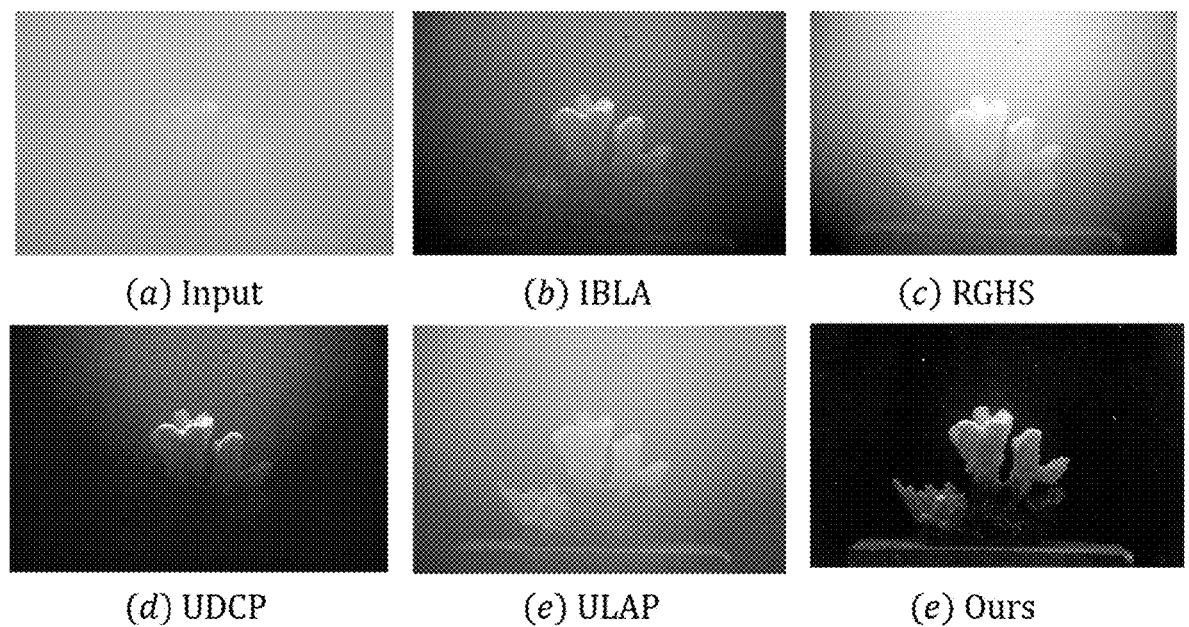

FIG. 13 shows comparative experimental results between this method and other methods. Comparative methods are peng's method (IBLA), huang's method (RGHS), UDCP method and Song's method (ULAP) respectively. The naked eye can see the superiority of the present invention in improving image vision, and the present invention is more effective than other methods.

4 Conclusion

The present invention proposes a new physics-based method to restore densely scattered images. This method allows features of better processing non-uniform illumination, which is ignored in common atmospheric light scattering models. The present invention uses completely real physical parameters to describe the distribution of backscattering and direct radiation, and uses the idea of curve fitting to remove backscattering. It is believed that this work will open up a new way for research of de-scattering, underwater enhancement and image restoration in turbid media.

The invention claimed is:

1. An image restoration method for restoring an attenuated image to generate a clear image, comprising:
    step 1: calibrating a vignetting of a camera by an integrating sphere for the attenuated image;
    step 2: converting image pixel coordinates into coordinates in a world coordinate system;
    step 3: establishing a de-scattering mathematical model, dividing the attenuated image into a direct radiation component and a backscattering component, and deriving a model mapping relationship a physical position of a light source and scattering for each of the direct radiation component and the backscattering component;
    step 4: removing the vignetting from the attenuated image to obtain a corrected image, sampling the corrected image, conducting OSTU binarization processing, and obtaining a partial pixel region of pure scattering for fitting and parameter calculation; and
    step 5: removing backscattering and attenuation from the entire attenuated image using the calculated parameters to obtain the clear image,
    wherein the direct radiation component is represented by $$I_d^c(x) = J^c(x) e^{-\sigma^c \left[ \left( Y_u - \frac{y}{f} Z \right) sec(\theta_Z) + r \right]}.$$

and
    wherein $I^c(x)$ represents a clear image, and r represents a distance from a pixel r(x, y) to the origin, when the light source is in a scattering medium, $Y_u$, refers to a distance from the object to the light source; otherwise, $Y_u$ refers to a distance of the object to the horizontal plane or to the top of the atmosphere.

2. The image restoration method according to claim 1, wherein step 1 further comprises:
    establishing a vignetting table;
    taking an original attenuated image by the integrating sphere, obtaining a correction factor at each pixel position, and
    using the correction factor to eliminate vignetting for the original attenuated image pixel by pixel by a look-up table method to obtain the corrected image.

3. The image restoration method according to claim 1, wherein the backscattering component is represented by $$L_b^c(x,y) = E^c e^{-\sigma^c Y_u sec(\theta_z)} \beta^c P(g, \alpha) \eta \int_0^{Z_s} e^{-\sigma^c \left[ -\frac{y}{f} sec(\theta_z) + \eta \right] Z} dZ.$$

4. The image restoration method according to claim 1, wherein the clear image is represented:

$$J^c(x) = \frac{I^c(x) - L_b^c(x,y)}{e^{-\sigma^c \left[ \left( Y_u - \frac{y}{f} Z \right) sec(\theta_Z) + r \right]}},$$

wherein $I^c(x)$ is an input image to be restored, $L_b^c(x, y)$ is the backscattering component, and $$e^{-\sigma^c\left[\left(\gamma_u - \frac{y}{f}Z\right)\sec(\theta_Z) + r\right]} \quad\quad 5$$

is the direct radiation component.

5. The image restoration method according to claim 1, wherein obtaining a partial pixel region of pure scattering comprises extracting pixels that only contain the scattering components, which comprises:
   a. converting the input image from a RGB space to an HSV space, and extracting a saturation channel and an intensity channel;
   b. calculating an optimal global threshold by OSTU maximum between-class variance method to obtain image regions with high intensity and saturation;
   c. further sampling at intervals in x and y directions of the image to generate a point set V; and
   d. applying an improved DCP-like rule within the point set V of the image:

$$J^c(x) = \min_{y \in \Omega(x)} (I^c(x)), \, x \in V$$

to obtain the image region of $J^c(x) \sim 0$.

6. The image restoration method according to claim 5, wherein physical parameters comprise an incident zenith angle of the sun, a direction angle, a focal length of the camera, illuminance, an extinction coefficient, a depth from an object to the camera, an anisotropy constant, and a distance from the object in water to a water surface.

7. The image restoration method based on the physical scattering model according to claim 6, wherein during fitting and parameter calculation, fitting and solving are performed in sequence according to the fitting priority of the parameters.

* * * * *